United States Patent [19]
Arendale

[11] 3,711,895
[45] Jan. 23, 1973

[54] AUTOMATIC CARCASS PROCESSING DEVICE

[76] Inventor: Donald L. Arendale, 722 Parkdale, Memphis, Tenn. 38116

[22] Filed: Aug. 10, 1971

[21] Appl. No.: 170,467

[52] U.S. Cl. ........................................17/1 R, 17/24
[51] Int. Cl. ......................................................A22b
[58] Field of Search ............17/1, 45, 24, 17; 134/99; 239/227; 118/2

[56] References Cited

UNITED STATES PATENTS

| 3,317,949 | 5/1967 | Garcia et al. | 17/24 |
| 3,178,763 | 4/1965 | Kolman | 17/1 R |
| 2,870,478 | 1/1959 | Schuster | 17/1 R |

*Primary Examiner*—Louis G. Mancene
*Assistant Examiner*—D. L. Weinhold
*Attorney*—John R. Walker, III

[57] ABSTRACT

Apparatus for removing blood clots from the jowl area and bone dust from the loin and rib area of the carcass of an animal intended for human consumption, e.g., a hog or the like. The apparatus comprises an overhead conveyor system having a plurality of roller hook assemblies runningly riding thereon with the respective carcasses depending therefrom. A rotatably driven drumlike brush assembly having a plurality of nozzles with water emanating therefrom is caused to travel horizontally until the peculiar resilient fingers thereof engage the carcass, thus initiating the accomplishment of the above-described processing. The brush assembly then is caused to travel vertically at a predetermined rate which is compatible with the rate of travel for the conveyor assembly so that as the brush assembly travels upwardly, one-half of the carcass is processed and downward travel thereof processes the opposite half. The apparatus automatically accomplishes the processing, i.e., completely without the assistance of manual labor. Accordingly, the apparatus includes various operable structure and other components constituting a control system for sequentially actuating the operable structure.

8 Claims, 7 Drawing Figures

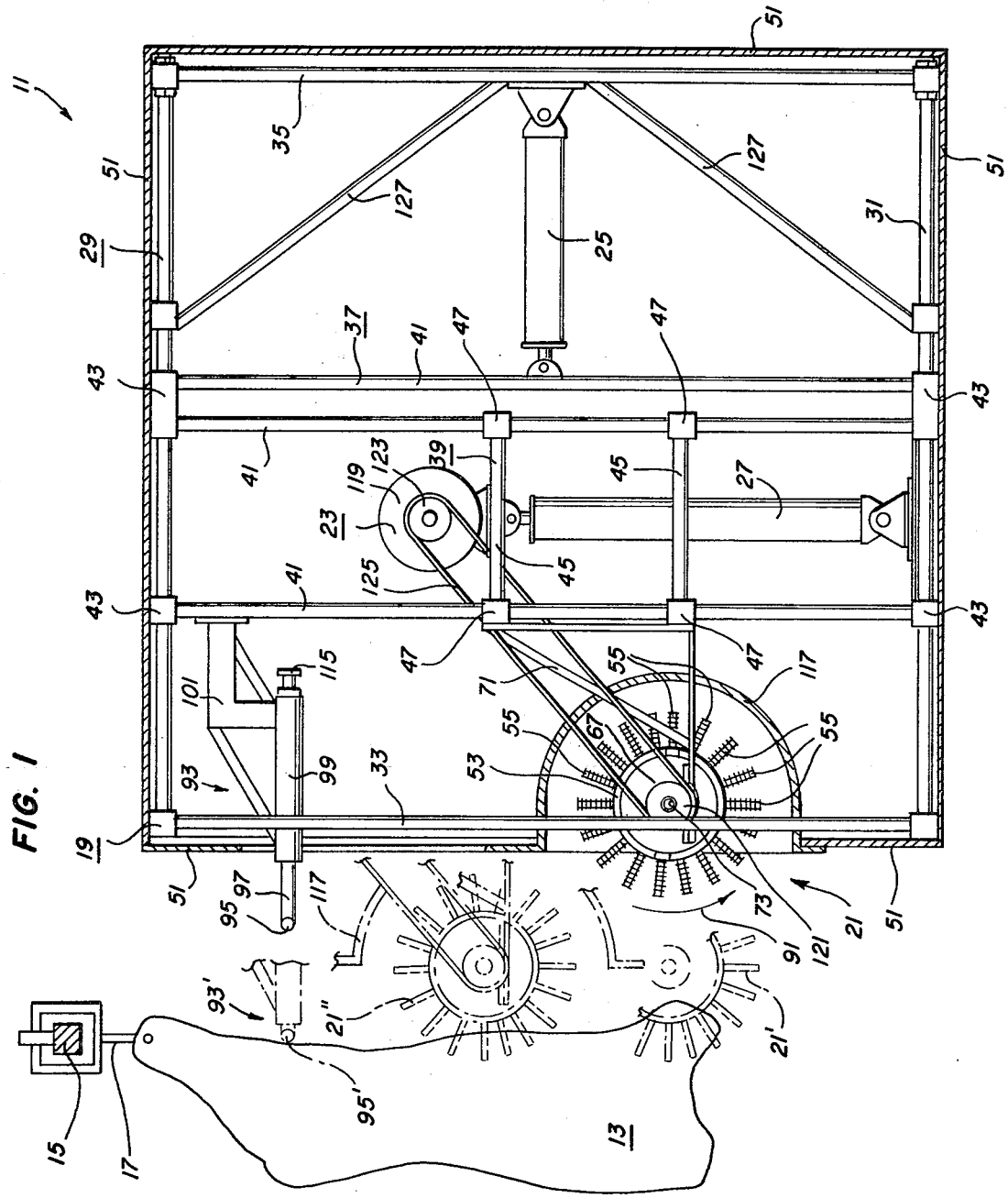

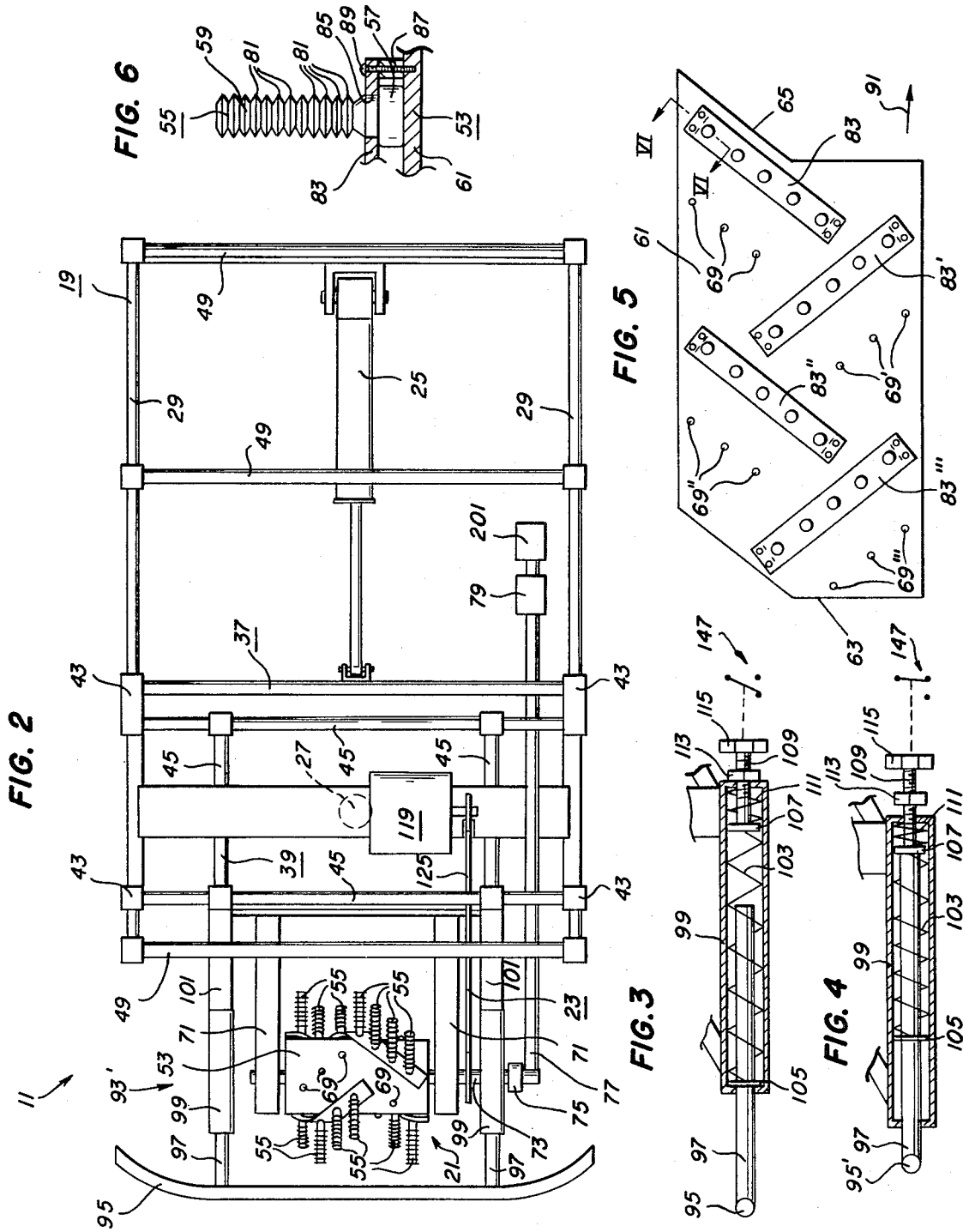

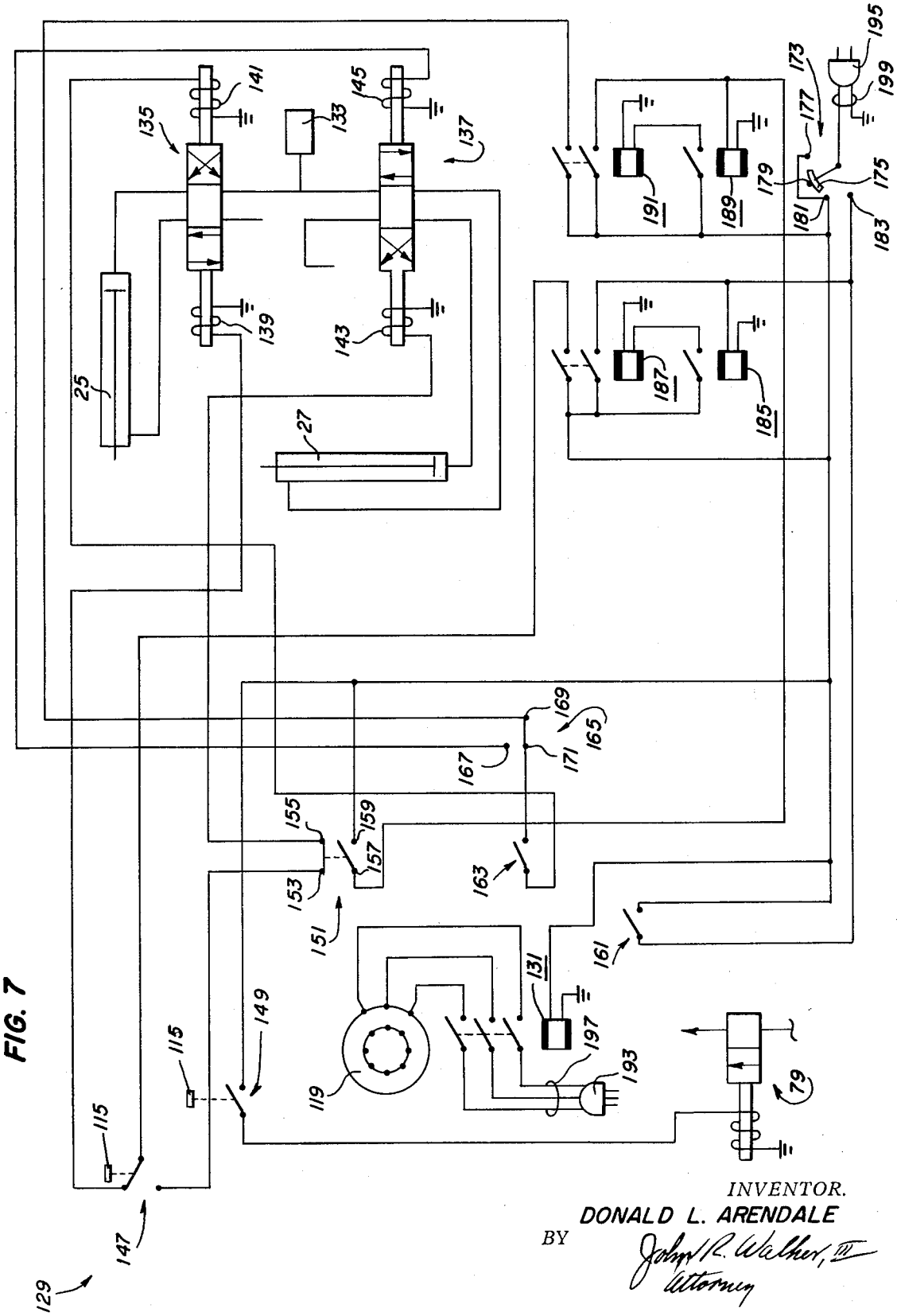

AUTOMATIC CARCASS PROCESSING DEVICE

BACKGROUND OF THE INVENTION

1. Field of the Invention

This invention relates to apparatus for treating carcasses, particularly removing blood clots from the jowl area and bone dust from the loin and rib area of the carcass of an animal, such as a hog intended for human consumption.

2. Description of the Prior Art

Prior devices known by the applicant include a hog neck cleaner manufactured by the Allbright Nell Company, Division of Chemetron Corporation, 5323 Southwestern Boulevard, Chicago, Illinois 60609. This device consists of a portable hand-held electrically powered rotating wheel having steel teeth for massaging the tissue of the carcass. This device is widely used in the art and has many disadvantages, the first of which being that it requires manual labor for the operation thereof, i. e., a workman holds the device in his hand and manually manipulates the rotating steel teeth about the area of the carcass for removing blood clots from the jowl area while a constant flow of water is played upon the carcass. Obviously, this is a most undesirable environment for a workman. Secondly, the splattering of water and objectionable residue from the carcass impairs the vision of the workman, even though he may be provided with a transparent face shield or the like. Accordingly, optimum cleaning or processing of the carcass is unlikely. As a matter of fact, a particular problem prevails in this respect in that all prior known methods of processing a carcass leave bone dust on the flesh of the carcass, particularly at the loin and rib area thereof. The bone dust is generated by the backbone of the carcass being sawed to spread the halves apart. The contact of the bone dust with the flesh of the carcass for a short period of time, e. g., overnight or the like, discolors the meat, resulting in degradation of the quality thereof.

A preliminary patentability search revealed the following U.S. Pat. Nos.: Knowlton 2,041,001; Kurt 2,132,634 and 2,562,556; Schuster U.S. Pat. No. 2,870,478; Roller et al. U.S. Pat. No. 3,024,795; Brechtel U.S. Pat. No. 3,038,481; Weprin U.S. Pat. No. 3,119,145; Kolman U.S. Pat. No. 3,178,763; Frederiksen U.S. Pat. No. 3,304,575; and Garcia et al. U.S. Pat. No. 3,317,949. None of the above references show or suggest applicant's device.

SUMMARY OF THE INVENTION

The present invention is directed towards overcoming the disadvantages and problems relative to previous devices used in the processing of carcasses. The concept of the present invention is to provide a device which will eliminate the need for a workman to be exposed to the previously described objectionable environment. In other words, the device of the present invention is completely automatic. Additionally, the device of the present invention completely removes the blood clots from the jowl area and the bone dust from the loin and rib area of the carcass, thus greatly enhancing the quality of the meat.

The apparatus of the present invention comprises an overhead conveyor system having a plurality of lower hook assemblies runningly riding thereon with the respective carcasses depending therefrom. A rotatably driven drumlike brush assembly having a plurality of nozzles with water emanating therefrom is caused to travel horizontally until the peculiar resilient fingers thereof engage the carcass, thus initiating the accomplishment of the previously described processing. The brush assembly is then caused to travel vertically at a predetermined rate which is compatible with the rate of travel for the conveyor assembly so that as the brush assembly travels upwardly, one-half of the carcass is processed and downward travel thereof processes the opposite half. A peculiar spreader bar assembly is telescopically attached to the frame of the device and resilient members urge the spreader bar outwardly from the frame, enabling the weight of the carcass to be used to an advantage in stabilizing itself while being vigorously engaged by the brush assembly.

The apparatus automatically accomplishes the processing completely without the assistance of manual labor. Electrically actuated pneumatically operated cylinders preferably are used for moving the brush assembly, as above-described. Accordingly, the apparatus includes various electrical components, etc., constituting a control system for sequentially actuating the pneumatic cylinders and other structure, e. g., drive structure rotatably driving the brush assembly, etc.

BRIEF DESCRIPTION OF THE DRAWINGS

FIG. 1 is a partially sectionalized side elevational view of the device of the present invention having the side panel thereof cut away to better illustrate the interior structure, showing certain structure of the device in phantom engaging a carcass and the horizontal drive cylinder retracted.

FIG. 2 is a plan view of the device of the present invention shown with the panels removed and the horizontal drive cylinder extended.

FIG. 3 is a sectional view of the telescoping structure supporting the spreader bar, showing the spreader bar in a relaxed disposition.

FIG. 4 is a view similar to FIG. 3 showing the spreader bar in a compressed disposition which causes electrical switch structure to be actuated.

FIG. 5 is a plan view of the circumferential portion of the brush assembly showing the circumferential portion in an uncurled or flat disposition and the preferred arrangement of the peculiar fingers and nozzles thereon.

FIG. 6 is a sectional view taken as on the line VI—VI of FIG. 5 showing the structure and attachment of the peculiar fingers with portions being shown in elevation.

FIG. 7 is a schematic of the control system symbolically showing the various operable structure and the interconnecting plumbing, e. g., conduits, etc., and electrical conductors interconnecting the various electrical components, etc.

DESCRIPTION OF THE PREFERRED EMBODIMENT

The device 11 of the present invention is intended for processing certain areas, i. e., removing blood clots from the jowl area and bone dust from the lung and rib area of a carcass 13 of an animal, e. g., a hog or the like, intended for human consumption. The device generally comprises an overhead conveyor rail means 15, roller hook means 17 runningly riding the rail means 15 for suspendingly supporting the carcass 13, frame means 19 positioned adjacent the rail means 15 so that the carcass 13 may confrontingly be presented to the frame means 19 as the carcass 13 is caused to travel along the rail means 15 in a manner obvious to those skilled in the art. The device 11 additionally includes drumlike brush means 21 rotatably attached to the frame means 19, drive means 23 rotatably driving the brush means 21 about a horizontal axis, horizontal cylinder and piston means 25 for moving the brush means 21 horizontally between a first position as shown in FIG. 1, i. e., displaced a predetermined distance from the confrontingly presented carcass 13, and a second position 21', i. e., wherein the outermost portion thereof engages certain lower hanging areas, e. g. the jowls of the carcass 13 and vertical cylinder and piston means 27 for moving the brush means 21 vertically between the second position, and a third position 21'', i.e., wherein the outermost portion of the brush means 21 engages certain upper hanging areas of the carcass 13, e.g., the loin and rib area.

The frame means 19 includes a pair of upper horizontal tubular members 29 and a pair of lower horizontally disposed tubular members 31. The upper members 29 are supported a predetermined distance above the lower members 31 by a forward pair of vertical tubular members 33 and a rearward pair of tubular members 35. The upper ends of the forward members 33 respectively are attached to one of the ends of the upper members 29 and the lower ends of the members 33 are fixedly attached respectively to one of the ends of the lower members 31 in a manner obvious to those skilled in the art. Additionally, the upper ends of the rearward members 35 respectively are attached to the opposite ends of the upper tubular members 29 and the lower ends of the rear members 35 are fixedly attached respectively to the other ends of the lower tubular members in a manner obvious to those skilled in the art.

The frame means 19 includes a horizontally traveling carriage assembly 37 and a vertically traveling carriage assembly 39. The carriage assembly 37 includes a plurality of vertically disposed tubular members 41 slidably attached respectively to the upper and lower tubular members 29, 31 in any well known manner, e.g., nylon slide bushings 43 or the like.

The carriage assembly 39 includes a plurality of horizontally disposed tubular members 45 slidably attached respectively to the tubular members 41 in any well known manner, e.g., nylon slide bushings 47 or the like.

The frame means 19 additionally includes a plurality of horizontally disposed transverse tubular members 49. In other words, the upper tubular members 49 interconnect the upper tubular members 29 and the lower tubular members 49 interconnect the lower tubular members 31 being fixedly attached thereto in any well known manner.

The frame means 19 preferably is enclosed on all sides with suitable panel members 51 in a manner obvious to those skilled in the art, e.g., using stainless steel sheet metal or the like.

The brush means 21 includes a cylindrical main body portion 53 and a plurality of resilient finger means 55 (FIGS. 1 and 6) radially ranged about the main body portion 53 and having the inner ends 57 thereof fixedly attached to the main body portion 53 establishing free ends 59 for engaging the carcass 13. The main body portion 53 preferably is formed from a planar member 61 having a shape substantially as depicted in FIG. 5 of the drawings. The planar member 61 is suitably bent so that the edge 63 thereof abuts the edge 65, the edges 63, 65 being fixedly attached one with the other as by welding or the like, thus forming a hollow cylinder. A pair of disks 67 are fixedly attached to the hollow cylinder adjacent the opposite ends thereof, thus forming the enclosed cylindrical main body portion 53 having a cavity therein.

The main body portion 53 includes a plurality of nozzle means 69 communicating with the cavity, i. e., the nozzle means 69 being arranged about the circumference of the main body portion 53 and fixedly attached thereto. In other words, the member 61 is provided with a plurality of apertures (not shown) for threadedly receiving respectively the plurality of nozzle means 69 in a manner obvious to those skilled in the art.

From FIGS. 1 and 2 of the drawings, it may be seen that the brush means 21 is rotatably attached to the vertical carriage assembly 39, i.e., the vertical carriage assembly 39 being carried by the horizontal carriage assembly 37. More specifically, a pair of arbor support members 71 are suitably attached to the carriage assembly 39 in any well known manner, as by welding or the like. The members 71 rotatably support a shaft 73 sealably extending through the main body portion 53, i.e., one of the disks 67 is provided with a suitable aperture (not shown) which is suitably attached to the shaft 73 and the other disk 67 is suitably attached to the opposite end of the shaft 73 in like manner. The shaft 73 preferably being hollow is provided with a plurality of apertures (not shown) along the length thereof that extends between the disks 67 or contained within the cavity of the main body portion 53.

The brush means 21 includes a flexible union means 75 which is suitably attached to the shaft 73. In other words, the flexible union 75 provides a means for fluid to communicate from a flexible but stationary conduit 77 to the rotating hollow shaft 73 in a manner obvious to those skilled in the art. It should be understood that various flexible unions 75 are available, however, I prefer to use a Deublin flexible union, marketed by the Deublin Company, Northbrook, Illinois, having a part No. 225–2200–27.

The device 11 includes a solenoid-actuated valve 79 for controllably communicating the nozzles 69 with a source of water under pressure, e. g., the usual municipal water supply. In other words, opening the valve 79 causes a steady stream of water to emanate from the plurality of nozzle means 69 as the brush means 21 is rotatably driven, in a manner yet to be disclosed.

From FIG. 6 of the drawings, it may be seen that each of the finger means 55 includes the inner end or enlarged root portion 57 and the free end or shank portion 59. Each of the finger means 55 is formed from a resilient substance, e. g., rubber or the like, and have a straight longitudinal axis thereto when in a relaxed disposition. The shank portion 59 is provided with a plurality of endless ridges 81 which extend circumferentially thereabout.

As the brush means 21 rotates, the shank portions 59 of the finger means 55 yield from the straight disposition when engaging the carcass 13 so as to present a plurality of the ridges 81 to the inner cavity walls of the carcass for enhancing therewith the gripping and rubbing ability of the finger means 55.

The brush means 21 additionally includes a plurality of platelike members 83 for holding the finger members 55 to the main body portion 53 as best illustrated in FIGS. 5 and 6 of the drawings. The platelike members 83 respectively are provided with a plurality of apertures 85 which are arranged in a straight line for individually receiving the shank portion 59 of the finger means 55, i.e., the enlarged root portions 57 contiguously engaging the main body portion 53 or the member 61 as best shown in FIGS. 5 and 6 of the drawings.

From FIG. 5 of the drawings, it may be seen that the platelike members 83 are arranged in a skewed pattern and are fixedly attached to the main body portion 53, i.e., attached to the member 61. More specifically, a pair of blocklike spacer members 87 are positioned adjacent the opposite ends of the platelike members 83, causing the platelike members 83 to stand away from the main body portion 53 or the member 61, i.e., the platelike members 83, the blocklike members 87, and the member 61 being provided with suitable apertures (not shown) for receiving a plurality of attachment bolts 89 in a manner obvious to those skilled in the art. It should be understood that the number of finger means 55 received by each of the platelike members 83 is optional; however, I prefer to use five fingers 55 and I prefer to use four platelike members 83 positioned substantially as depicted in FIG. 5 of the drawings.

From FIG. 5 of the drawings, it may be seen that the plurality of nozzle means 69 preferably are arranged in groups, e.g., each of the groups forming a straight line which is substantially parallel with an adjacent line of fingers 55. In other words, FIG. 5 shows the group of nozzles 69 being directly behind the platelike member 83, the group of nozzles 69' being directly behind the platelike member 83', the group of nozzles 69'' being directly behind the platelike member 83'', and the group of nozzles 69''' being directly behind the platelike member 83''', i.e., the main body portion 53 being positioned between the arbors 71, thusly with respect to the direction of rotation of the brush means 21. The direction of rotation preferably is in the direction as indicated by the arrow 91.

The device 11 additionally includes spreader bar means 93 for engaging the confrontingly presented carcass 13 and spreading the two halves of the carcass 13 open to a substantially flat disposition to facilitate optimum engagement thereof with the rotatably driven brush means 21.

The spreader bar means 93 includes a spreader bar member 95 telescopically attached to the horizontally traveling carriage assembly 37 as best illustrated in FIGS. 1 - 4 of the drawings. More specifically, the spreader bar member 95, having a shape substantially as depicted in FIG. 2 of the drawings, is horizontally disposed and is provided with a pair of rodlike members 97 fixedly attached thereto adjacent the opposite ends thereof. The free ends of the rodlike members 97 are telescopically slidably received respectively within a pair of tubular members 99, as best illustrated in FIGS. 3 and 4 of the drawings. The tubular members 99 are suitably attached to the vertically disposed tubular members 41 in a manner obvious to those skilled in the art, e.g., support structure or brackets 101 (FIG. 1) or the like. The support brackets are fixedly attached to the tubular members 99 and the vertical members 41 in any well known manner, as by welding or the like.

From FIGS. 3 and 4 of the drawings, it may be seen that the spreader bar means 93 additionally includes a pair of compression springs 103, i.e., the springs 103 being received within the tubular members 99 so as to convolutely circumferentially engage the respective rodlike members. The rodlike members 97 are provided with respective shoulder portions 105 having one of the ends of the springs 103 resting thereon. The opposite ends of the springs 103 respectively rest against a pair of boss members 107. The boss members 107 respectively include shank portions 109 extending outwardly through the respective tubular members 99. The spreader bar member 93 additionally includes a pair of compression springs 111 having a strength considerably greater than the compression springs 103. Actually, urging the rodlike members 97 inwardly so as to fully compress the compression springs 103 does not compress the compression springs 111, i.e., the inner ends of the rodlike members 97 engage the boss members 107, causing displacement of the boss members 107 as shown in FIGS. 3 and 4 of the drawings.

Displacement of the boss members 107 is utilized to actuate electrical switch structure obvious to those skilled in the art but will be fully disclosed later in the specification. The shank portions 109 of the boss members 107 preferably are threaded to receive adjustment nuts 113 and typical switch-actuating structure 115. The spreader bar means 93, being attached to the carriage assembly 37 has an inner position and an outer position, i.e., the inner position being as shown in FIG. 1 of the drawings by the numeral 93 and the outer position being as shown in FIGS. 1 and 2 of the drawings by the numeral 93'. Additionally, the spreader bar member 95, being movable relative to the support brackets 101, has two positions, i.e., a relaxed position as best shown in FIGS. 1 - 3 of the drawings and character referenced by the numeral 95 and a compressed position as shown in FIGS. 1 and 4 of the drawings and character referenced by the numeral 95'. It should be understood that the spreader bar member 95 assumes the position 95' by engaging the carcass 13, the spreader bar means being moved to the outer position 93', i.e., the carcass being sufficiently heavy to cause both pairs of compression springs 103, 111 to be compressed. In this regard, it should be pointed out that when it is desirable to clean the device 11, a bumper bar (not shown) preferably is placed in front of the spreader bar member 95 to insure that the spreader bar member is urged to the position as depicted by the numeral 95' so as to displace the switch-actuating structure 115 for reasons yet to be disclosed.

In other words, extending the cylinder 25 from the position depicted in FIG. 1 to the position depicted in FIG. 2 causes the spreader bar means 93 to move from the position depicted by numeral 93 to the position depicted by numeral 93'. Accordingly, when the spreader bar 95 meets with resistance, e.g., the carcass 13 or the bumper bar alluded to above but not shown, further travel of the cylinder 25 toward the fully extended position causes the spreader bar 95 to compress the springs 103, 111 and thusly assume the position depicted by the numeral 95'. In this manner, the weight of the carcass 13 is used to an advantage in stabilizing itself while being briskly engaged by the rotating brush means 21.

The brush means 21 includes a shroud 117 which deflects the water emanating from the nozzle means 69, i.e., preventing the interior of the device 11 enclosed by the panel members 51 from becoming wet. The shroud 117 is suitably attached to the arbor support members 71 in a manner obvious to those skilled in the art, i.e., the shroud 117 moves outwardly from the frame means 19 with the brush means to the position 21' and upwardly with the brush means to the position 21'' as best illustrated in FIG. 1 of the drawings.

The drive means 23 includes an electric motor 119 rotatably driving a pulley 121 fixedly attached to the shaft 73 through a rotatably driven output pulley 123 and an endless belt 125. The motor 119 is suitably attached to the vertically traveling carriage assembly 39 as is is the brush means 21. Accordingly, actuating the cylinder 27 moves the carriage assembly 39 upwardly, carrying the motor 23 and the brush means 21 therewith. Additionally, actuating the cylinder 25 causes the carriage assembly 37 to move outwardly which carries the carriage assembly 39, the motor 119, the brush means 21, and the spreader bar means 93 therewith. In this regard, it may be desirable that the frame means 19 include additional reinforcing tubular members 127 diagonally disposed as depicted in FIG. 1 so that when the cylinder 25 is actuated, the stress on the vertical members 35 is minimized.

Particular attention is now directed towards FIG. 7 of the drawings wherein a control means 129 is shown for sequentially actuating the cylinders 25, 27, the solenoid valve 79, and the electric motor 119. The motor 119 preferably being a three-phase 220 volt induction motor is provided with a magnetic starter assembly 131.

The cylinder piston assemblies 25, 27 preferably are pneumatically operated by a source of air pressure 133, i.e., the cylinder 25 is controllably actuated by a solenoid activated valve assembly 135 and the cylinder 27 is controllably actuated by the solenoid activated valve assembly 137. More specifically, the valve 135 includes a coil 139 which, when energized, moves the valve 135 to the right, as when viewed in FIG. 7, thus communicating the source of air pressure 133 with the cylinder 25 to cause the cylinder 25 (or piston therein) to be extended. Additionally, the valve 135 includes a coil 141 which, when energized, moves the valve 135 to the left or communicates the source 133 with the back side of the piston within the cylinder 25, thus causing the cylinder 25 (or piston therein) to move in or be retracted.

Further, the valve 137 includes a coil 143 which, when energized, causes the valve 137 to move to the right, as viewed in FIG. 7, thus communicating the source 133 with the front side of the piston within cylinder 27, causing the cylinder 27 (or piston therein) to be extended upwardly. Further, the valve 137 includes a coil 145 which, when energized, moves the valve 137 to the left, as viewed in FIG. 7, thus causing the source 133 to communicate with the back side of the piston for the cylinder 27 or retracting the cylinder 27 (or piston therein).

The control means 129 also includes a single pole double throw switch 147 and a single pole single throw switch 149 both of which being actuated by the switch-actuating structure 115 previously described and best illustrated in FIGS. 3 and 4 of the drawings. The switches 147, 149 (FIG. 7) are shown in the preferred position when the spreader bar 25 is in the relaxed position depicted by the numeral 95. The control means 129 also includes a double pole double throw switch 151 which is typically actuated mechanically when the cylinder 27 is fully extended, i.e., the switch 151 is shown in FIG. 7 in the normal position or when the cylinder 27 is retracted as shown. More specifically, the switch 151 includes a pair of contacts 153, 155 which are closed when the cylinder 27 is in any position other than fully extended and a pair of contacts 157, 159 which are open when the cylinder is in any position other than fully extended.

The control means 129 additionally includes a single pole single throw switch 161 which is biased to the open position as shown. The switch 161 is positioned adjacent the rail 15 in such a manner that when the roller hook means 17 passes adjacent the switch 161 a whisker (not shown) engages the roller means 17 and momentarily closes the switch 161, in a well known manner.

The control means 129 additionally includes a single pole single throw switch 163 which is typically mechanically actuated by the cylinder 25, i.e., the switch 163 is biased to a closed position; however, the switch 163 is moved to the open position when the cylinder 25 is fully retracted as shown in FIG. 7. In other words, immediately upon energizing the coil 139, the cylinder 25 is moved toward the extended position, thus closing the switch 163.

The control means 129 additionally includes a single pole double throw switch 165 which is moved to the up position, as viewed in FIG. 7, when the cylinder 27 or the piston thereof moves toward the extended position, i.e., moves away from the fully retracted position. The switch 165 moves down, as viewed in FIG. 7, when the cylinder 27 is fully retracted. In other words, the switch 165 includes the contacts 167, 169 which are closed as the piston of the cylinder 27 moves from the fully retracted position and the contact 169 is connected with a contact 171 when the cylinder 27 is fully retracted.

The control means 129 additionally includes a rotary switch 173 having a broad wiper contact 175 and the four terminal contacts 177, 179, 181 and 183. The switch 173 is in the off position when the wiper contact 175 engages the contact 179 as viewed in FIG. 7. The switch 173 has two on positions, i.e., an automatic position and a manual position. The switch 173 is in the automatic position when the wiper 175 engages the contact 177. The switch 173 is in the manual position when the wiper 175 engages the contact 181; however, in moving the switch 173 to the manual position, the contact 175 simultaneously and momentarily makes contact with both the contacts 181, 183. In other words, the wiper 175 is biased away from the contact 183 but will come to rest while contacting the contact 181, for reasons yet to be disclosed.

The control means 129 additionally includes a single pole single throw relay 185 which operates in conjunction with a double pole single throw time delay relay 187. The relay 187 is so constructed that it closes instantly when energized and automatically trips to the open position after a predetermined period of time, e.g., 6 seconds or the like.

The control means 129 additionally includes a single pole single throw relay 189 which operates in conjunction with a double pole single pole time delay relay 191, i.e., the relay 191 being substantially identical to the just described relay 187.

The control means 129 also includes an electrical disconnect plug 193 for the three phase 220 volt motor 119. Further, a main disconnect plug 195 is included and is intended to be plugged into the usual commercial 120 volt single phase power source. In other words, the plug 193 is attached to a cable 197 and the plug 195 is attached to a cable 199.

The preferred operation of the control means 129 is as follows: The switch 173 is placed in the automatic on position which merely places the device 11 in a state of readiness, i.e., the magnetic starter 131 is energized which energizes the motor 119 which causes the cylindrical main body portion 53 having the finger means 55 attached thereto to rotate in the direction of the arrow 91. The carcass 13 passes the whisker adjacent the rail 15 which closes the switch 161 momentarily. Closing the switch 161 causes the relay 185 to be energized momentarily. Energizing the relay 185 in turn energizes the relay 187. The lower set of contacts for the relay 187 holds the relay 185 in the energized position. The upper set of contacts for the relay 187 sends current to the switch 147, thus energizing the coil 139. Energizing the coil 139 extends the cylinder 25 in a manner previously described, i.e., closing the switch 163 and moving the rotating brush means 21 to the position depicted by the numeral 21'. Additionally, extending the cylinder 25 causes the carcass to compress the spreader bar 95 which assumes the previously described position 95', thus the switch-actuating structure 115 moves the switch 147 downwardly as viewed in FIG. 7, and additionally closes the switch 149.

Closing the switch 149 energizes the solenoid valve 79, i.e., moves the valve 79 to the right as viewed in FIG. 7 delivering water through the flexible conduit 77, the tubular shaft 73 and water emanates outwardly from the nozzle means 69, 69', 69" and 69"'. It should be pointed out that the nozzle means 69, 69', 69" and 69"' include suitable orifice structure which causes a fan spray to emanate therefrom in a manner obvious to those skilled in the art. Each of the nozzles 69 preferably are so oriented on the main body portion 53 so that the fan spray is horizontally played on the carcass 13.

Moving the switch 147 downwardly interrupts current flow to the coil 139 and energizes the coil 143, i.e., through the contacts 153, 155 of the switch 151. Energizing the coil 143 extends the cylinder 27 in the manner previously described, i.e., moves the brush means 21 from the position 21' to the position 21". Additionally, the contacts 153, 155 of the switch 151 are opened and the contacts 157, 159 of the switch 151 are closed. Further, the contacts 167, 169 of the switch 165 are closed. It should be pointed out that the movement of the carcass 13 along the rail 15 preferably is accomplished in an automatic well known manner at a predetermined speed. In other words, the carcass preferably moves constantly while the brush means 21 moves from the position 21' to the position 21", in so doing, the first half of the carcass 13 is processed from bottom to top. Further, the opposite half of the carcass is processed by the brush means 21 when the brush means 21 is moved from the position 21" to the position 21' in a manner yet to be disclosed. Additionally, it should be pointed out that the time set into the time delay relay 187 is such that when the brush means reaches the position 21", the relay 187 automatically becomes de-energized.

It should now be apparent to those skilled in the art that de-energizing the relay 187 is, in a sense, incidental to de-energizing the coil 143 or is a back up assurance only since the coil 143 was de-energized when the circuit was interrupted between the contacts 153, 155 as just described. However, it will be appreciated that the contacts 153, 155 remain open very briefly since the switch 151 returns to its normal position when the cylinder 27 moves from the fully extended position. Accordingly, the relay 187 preferably is timed to become de-energized during this brief period, thus precluding re-energizing the coil 143 at this time.

In other words, closing the contacts 157, 159, as just described, when the cylinder 27 is fully extended, energizes the relay 189 momentarily. Energizing the relay 189 starts a yet to be described train reaction which ultimately opens the contacts 157, 159 and closes the contacts 153, 155 of the switch 151; however, the time delay relay 187 has automatically become de-energized during the interim so that closing the contacts 153, 155 will not again energize the coil 143 at this time.

More specifically, the momentary energizing of the relay 189 in turn energizes the relay 191. Energizing the relay 191 enables the lower set of contacts thereof to hold the relay 189 in the energized position. The upper set of contacts for the relay 191 deliver current to the switch 165, across the contacts 169, 167 thereof, to energize the coil 145. Energizing the coil 145 retracts the cylinder 27 in the manner previously described, i.e., closes the contacts 153, 155 of the switch 151 and opens the contacts 157, 159 thereof, moves the brush means 21 downwardly from the position 21" to the position 21', and opens the contacts 167, 169 of the switch 165 and closes the contacts 169, 171 thereof.

Opening the contacts 167, 169 of the switch 165 de-energizes the coil 145 and in turn energizes the coil 141, i.e., through the closed switch 163. Energizing the coil 141 retracts the cylinder 25 in the manner previously described, i.e., moves the brush means from the position 21' to the normally at rest position depicted by the numeral 21 and when the piston of the cylinder 25 reaches the fully retracted position, the switch 163 is tripped open, thus de-energizing the coil 141. The time delay relay 191 preferably is pre-set to a predetermined time so as to automatically become de-energized subsequently to the switch 163 being tripped to the open position.

Subsequent to the time delay relay 191 automatically becoming de-energized, the carcass 13 has preferably moved away from the spreader bar 95, i.e., enabling the spreader bar to return to the previously described relaxed position as depicted by the numeral 95, thus actuating the switch-actuating structure 115 in the manner previously described, i.e., moving the switch 147 upwardly, as viewed in FIG. 7 and opening the switch 149 which de-energizes the valve 79, thus moving the valve leftwardly, as viewed in FIG. 7, or to the off position. Thus, the flow of water from the nozzle means 69, 69', 69" and 69''' is interrupted.

Accordingly, the time delay relay 191 and the time delay relay 187 are both de-energized and the control means 129 have been completely cycled and may be recycled as the succeeding carcass 13 moves into a position which trips the switch 161, thus starting the just-described sequence for a second time, etc., ad infinitum. Obviously, the just-described sequence is repeated for each carcass 13. Accordingly, the spaced apart distance between the carcasses should be predetermined and the speed of the roller assembly 17 preferably is such that sufficient time is allowed for the control means 129 to go through a full cycle before the succeeding roller assembly 17 comes in contact with the switch 161. In this regard, I have found that an optimum setting for the relays 187, 191 is approximately six seconds. However, I do not wish to be limited to a specific time for the relays 187, 191 since the control means 129 may be programmed to be compatible with other times.

The control means 129 includes structure which facilitates moving the device 11 through the various positions as described for cleaning purposes. Accordingly, a master valve 201 (FIG. 2) is provided which may be closed so that energizing the valve 79 will not cause water to emanate from the nozzle means 69, 69', 69" and 69''' as the control means 129 may be sequentially activated.

In other words, the switch 173 may be rotated counterclockwise to the previously described manual position so that the wiper 175 thereof engages the contacts 181, 183 simultaneously, the wiper 175 being biased away from the contact 183 as previously described. However, momentary contact between the wiper 175 and the contact 183 bypasses the switch 161, thus momentarily energizing the relay 185 and starting the cycle for the control means 129 as above described. It should be understood that suitable bumper structure (not shown) but as previously described is suitably positioned so that when the cylinder 25 is extended, the spreader bar 95 engages the bumper, thus displacing the spreader bar 95 to the position 95' to effect the above-described actions for the switches 147, 149. Accordingly, the control means 129 will go through the above-described cycle in its entirety as though a carcass were holding the spreader bar 95 in the position depicted by the numeral 95'. Thus, the switch 173 may be moved to the previously described off position indiscriminately depending upon the desired position of the movable structure of the device 11 to facilitate better access for cleaning purposes or the like. Obviously, re-energizing the control means 129 may necessitate rotating the switch 173 to the manual position in the manner just-described, i. e., depending upon the particular sequence at which the control means was disabled. In other words, if the control means 129 is in the latter half of its cycle, the relay 185 need not be re-energized. Accordingly, the switch would merely be moved to the manual position without engaging the wiper 175 with the contact 183.

Although the invention has been described and illustrated with respect to a preferred embodiment thereof, it is not to be so limited since changes and modifications may be made therein which are within the full intended scope of the invention.

I claim:

1. A device for processing certain areas of the carcass of an animal intended for human consumption, said device comprising overhead conveyor rail means, roller hook means runningly riding said rail means for suspendingly supporting the carcass and for moving the carcass along said rail means, frame means positioned adjacent said rail means so that the carcass may confrontingly be presented to said frame means as said carcass is caused to move along said rail means, drumlike brush means rotatably attached to said frame means, means rotatably driving said brush means about a horizontal axis, means for moving said brush means horizontally between a first position displaced a predetermined distance from the confrontingly presented carcass and a second position wherein the outermost portion thereof engages certain lower hanging areas of the confrontingly presented carcass, and means for moving said brush means vertically between said second position and a third position wherein the outermost portion of said brush means engages certain upper hanging areas of the carcass.

2. The device of claim 1 in which said drumlike brush means includes a cylindrical main body portion and a plurality of resilient finger means radially arranged about said main body portion and having the inner ends thereof fixedly attached to said main body portion establishing free ends for engaging the carcass, said main body portion being of hollow construction establishing a cavity therein, said main body portion includes a plurality of nozzle means communicating with said cavity, said nozzle means being arranged about the circumference of said main body and fixedly attached thereto, and flexible union means attached to said main body portion communicating a source of water under pressure with said cavity of said rotating brush means so that a plurality of steady streams of water emanate from said plurality of nozzle means as said brush means is rotatably driven.

3. The device of claim 1 in which is included spreader bar means attached to said frame means for engaging the confrontingly presented carcass and spreading the two halves of the carcass open to a substantially flat disposition to facilitate optimum engagement thereof with said brush means.

4. The device of claim 3 in which is included resilient means for urging said spreader bar outwardly from said frame means enabling the weight of the carcass to be used to an advantage in stabilizing itself while being engaged by said brush means.

5. The device of claim 2 in which said means for moving said brush means horizontally and vertically comprises pneumatic cylinder means and said device additionally includes solenoid actuated valve means for controlling the flow of water to said nozzle means and control means for sequentially actuating said pneumatic cylinder means and said valve means.

6. The device of claim 5 in which said spreader bar means includes means for initiating and terminating actions of said control means as said carcass is caused to engage and disengage said spreader bar means.

7. The device of claim 2 in which each of said plurality of resilient finger means includes an enlarged root portion and a shank portion, said shank portion having a straight longitudinal axis thereto and includes a plurality of endless ridges circumferentially disposed thereabout, said shank portion yielding from said straight disposition when engaging said carcass so as to present a plurality of said ridges to the inner cavity walls of the carcass for enhancing therewith the gripping and rubbing ability thereof.

8. The device of claim 7 in which is included a plurality of plate means for holding said finger means to said main body portion, said plate means being provided with a plurality of apertures arranged in a straight line for receiving said shank portions of said finger means so that said enlarged root portions contiguously engage said main body portion of said brush means, said plate means being arranged in a skewed pattern and fixedly attached to said main body portion of said brush means, and said nozzle means being arranged in groups, each of said groups forming a straight line being substantially parallel an adjacent line of finger means, one of said groups of nozzle means being directly behind each of said plate means with respect to the direction of rotation of said brush means.

* * * * *